US006658840B2

(12) United States Patent
Iiyama et al.

(10) Patent No.: US 6,658,840 B2
(45) Date of Patent: Dec. 9, 2003

(54) APPARATUS FOR AND METHOD OF CONTROLLING A VEHICLE ENGINE

(75) Inventors: Akihiro Iiyama, Zushi (JP); Koudai Yoshizawa, Yokosuka (JP); Teruyuki Itoh, Ohta-ku (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/120,829

(22) Filed: Apr. 12, 2002

(65) Prior Publication Data

US 2002/0162321 A1 Nov. 7, 2002

(30) Foreign Application Priority Data

Apr. 13, 2001 (JP) ........................................ 2001-114997

(51) Int. Cl.[7] ................................................. F01N 3/00
(52) U.S. Cl. ............................. 60/285; 60/274; 60/300; 60/303
(58) Field of Search ........................ 60/274, 285, 284, 60/300, 303

(56) References Cited

U.S. PATENT DOCUMENTS 5,960,752 A * 10/1999 Hirakata et al. ........ 123/65 PE
6,041,591 A * 3/2000 Kaneko et al. ............... 60/274
6,293,246 B1 * 9/2001 Tanahashi et al. .......... 123/305
6,340,016 B1 * 1/2002 Ueda et al. ................. 123/305
6,354,264 B1 * 3/2002 Iwakiri et al. .............. 123/305
6,390,057 B2 * 5/2002 Yoshizawa et al. ......... 123/295
6,422,200 B1 * 7/2002 Morikawa et al. .......... 123/305
2002/0014072 A1 * 2/2002 Nakagawa et al. ........... 60/285

FOREIGN PATENT DOCUMENTS

JP    2000-87749     3/2000
JP    2000-265873    9/2000

* cited by examiner

Primary Examiner—Thomas Denion
Assistant Examiner—Diem Tran
(74) Attorney, Agent, or Firm—Foley & Lardner

(57) ABSTRACT

Controlling of an engine provided with a catalytic converter in an exhaust passage is executed during an idling operation of the engine to heat catalyst in the catalytic converter while permitting the self-ignition combustion mode to be performed in the engine when the catalyst is in a non-active condition, and when the temperature Te of the engine cooling water is higher than a predetermined threshold value Te1, and to allow execution of the self-ignition combustion mode as well as the idling-stop function when the catalyst is in an active condition, and when the temperature Te of the engine cooling water is higher than a predetermined threshold value Te2 that is larger than the predetermined threshold value Te1.

14 Claims, 3 Drawing Sheets

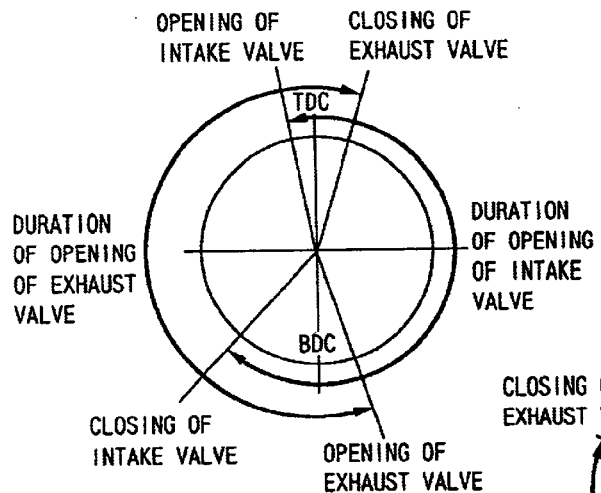
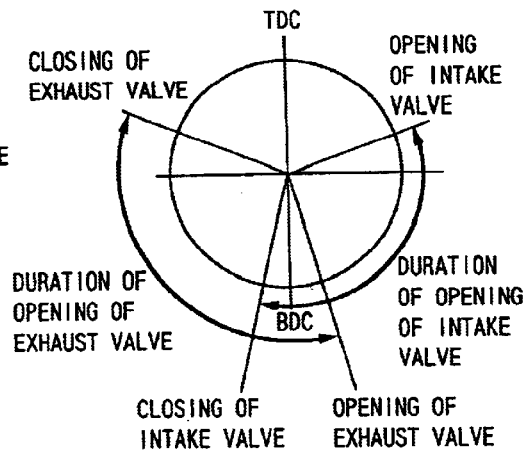
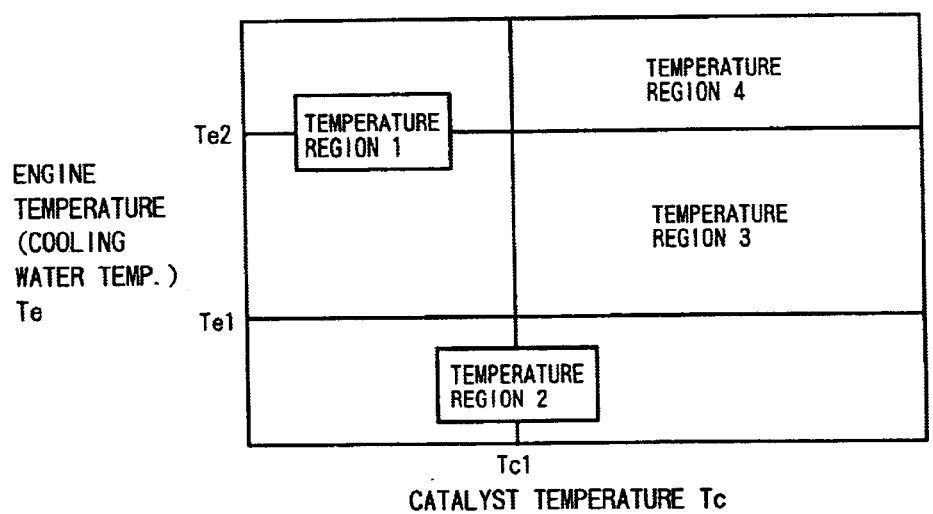

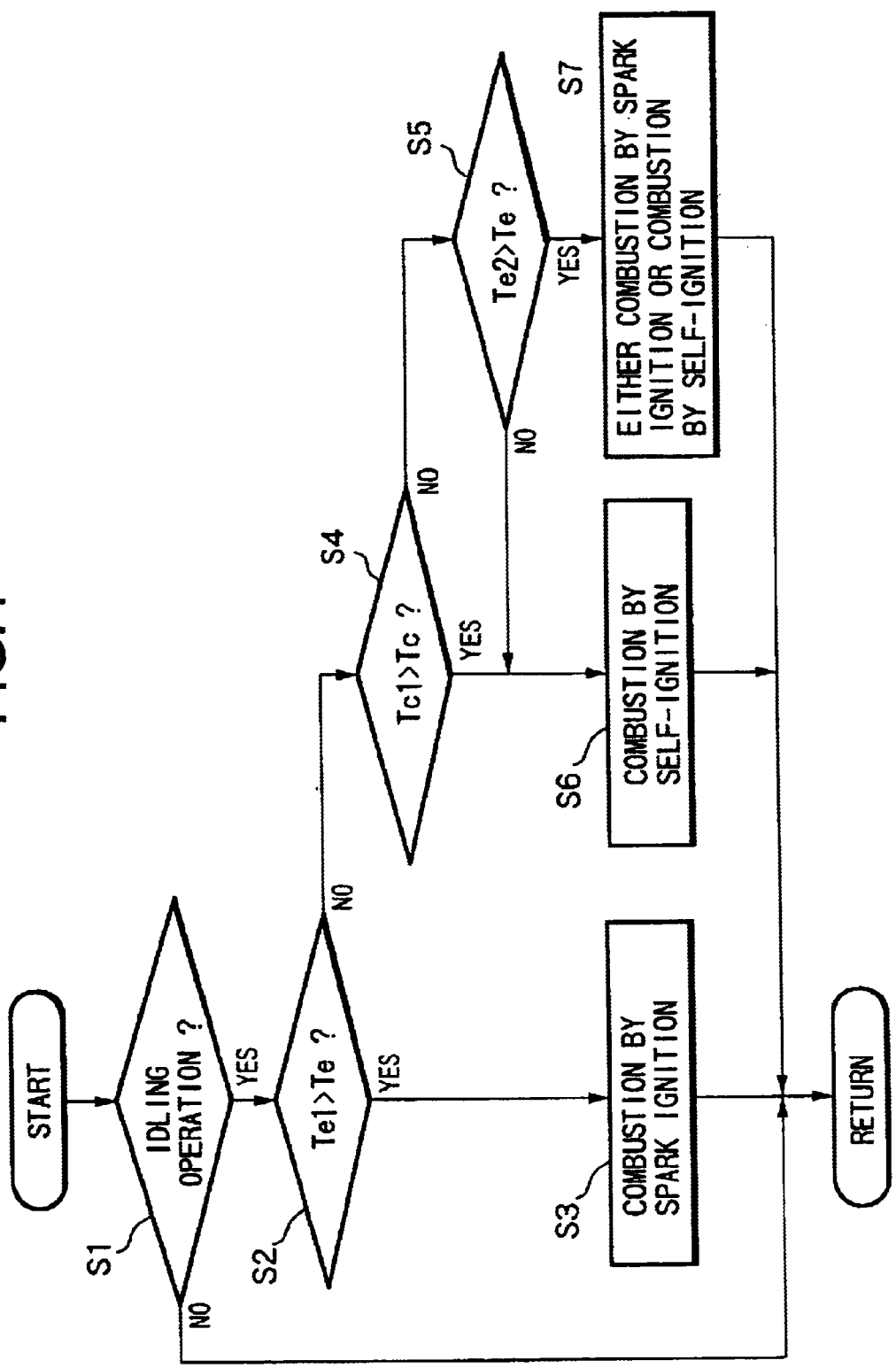

APPARATUS FOR AND METHOD OF CONTROLLING A VEHICLE ENGINE

BACKGROUND OF THE INVENTION

1. Field of the Invention

The present invention generally relates to an apparatus for and method of controlling a vehicle engine, and more particularly, relates to a technique for selecting a combustion mode from a self-ignition combustion mode and a spark ignition combustion mode, during the idling operation of the engine.

2. Description of the Related Art

Hitherto, there has been disclosed in Japanese Unexamined Patent Publications No. 2000-087749 and No. 2000-265873, an engine capable of operating so as to select a combustion mode from a self-ignition combustion mode and a spark ignition combustion mode.

Japanese Unexamined Patent Publication No. 2000-087749 includes therein a description of a technical construction for preventing the self-ignition combustion mode during the time that an engine is still cold and is deteriorated in its stability of the self-ignition combustion mode.

Japanese Unexamined Patent Publication No. 2000-265873 includes therein a description of a technical constitution in which the spark ignition combustion mode is selected during the time that catalyst has not yet been activated in order to direct the flow of the high-temperature exhaust gas obtained by the spark ignition combustion mode toward a catalytic converter to thereby hasten the activity of catalyst.

SUMMARY OF THE INVENTION

Although the catalyst can be activated by the spark ignition combustion mode, it is impossible to purify HC (hydrocarbon) and NOx (nitrogen oxide) in the exhaust gas by the catalyst until the catalyst is sufficiently activated. Concerning HC, if appropriate HC adsorbent is disposed in the exhaust passage of an engine, an amount of HC expelled from the engine into the atmosphere might be reduced. However, concerning NOx, there is no effective measure for reducing an amount of NOx expelled into the atmosphere before the catalyst is activated. Therefore, even if spark ignition combustion mode is taken place before the catalyst is activated, it is impossible to satisfactorily reduce expelling of the harmful components of the exhaust gas from the engine into the atmosphere.

Thus, an object of the present invention is to provide an apparatus for and a method of controlling a vehicle engine, which enable it to promote rapid activation of a catalyst as well as to reduce an amount of exhaustion of NOx from the engine before catalyst is activated.

In order to achieve the above-mentioned object, the present invention is constituted such that a combustion made is selected from a self-ignition combustion mode and a spark ignition combustion mode based on a temperature Te of a vehicle engine and a temperature Tc of a catalyst, to control the engine according to the selected combustion mode when the engine is in idling operation, The other objects and features of the present invention will become understood from the following description of a preferred embodiment thereof with reference to the accompanying drawings.

BRIEF EXPLANATION OF THE DRAWINGS

FIGS. 2A and 2B are diagrammatic views illustrating the characteristic of valve timing of the engine;

FIG. 3 is a schematically diagrammatic view illustrating a map of various temperature regions in connection with the engine or cooling water temperature and the catalyst temperature; and, FIG. 4 is a flow chart illustrating the process of selecting one of the combustion modes.

DETAILED DESCRIPTION OF THE PREFERRED EMBODIMENT

Figure 1:
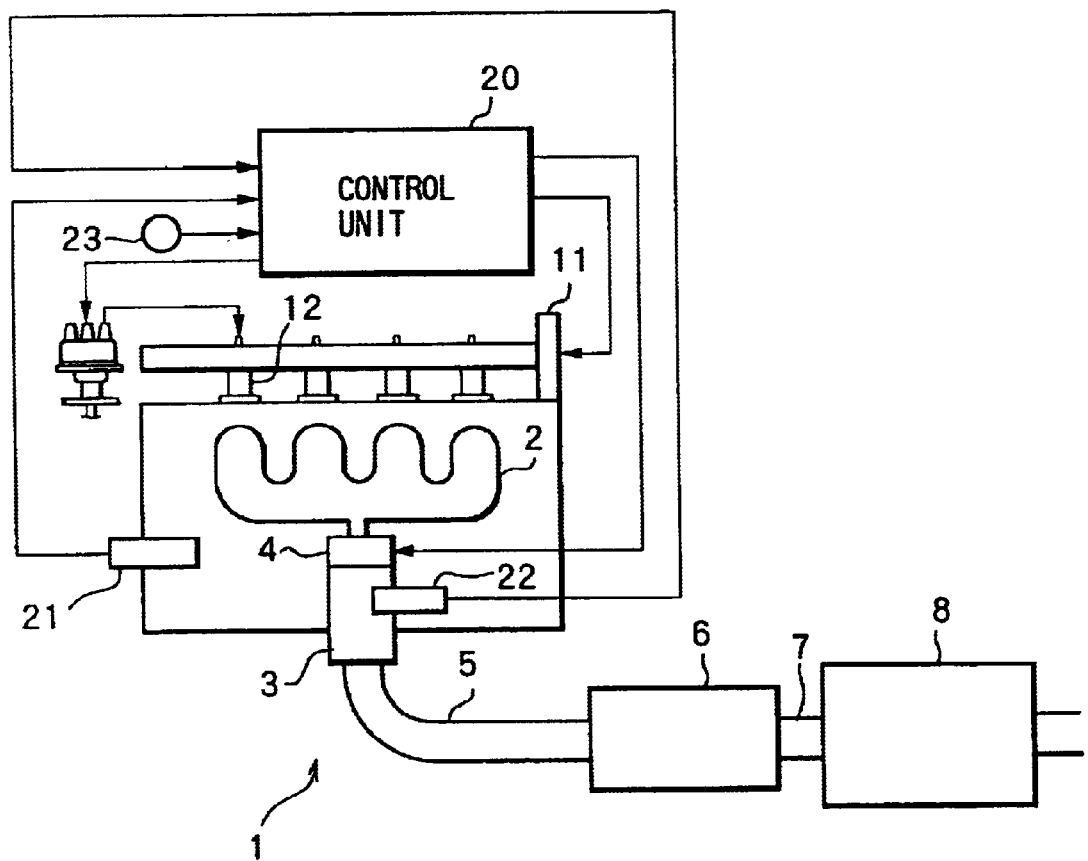
FIG. 1 is a schematic block diagram illustrating an entire system of a vehicle engine.

Referring to FIG. 1, a vehicle engine 1 is constructed so as to operate by selecting a combustion mode from a spark ignition combustion mode by spark plugs and a self-ignition combustion mode due to compression.

The exhaust gas expelled from each of cylinders of the engine 1 is collected by an exhaust manifold 2, and then enters a first catalytic converter 3 connected to the exhaust manifold 2. The first catalytic converter 3 consists of a three-way catalyst, which is internally provided, at its upstream side, with a heater 4. A first exhaust pipe 5 connected, at its one end, to an outlet of the first catalytic converter 3 is connected, at its other end, to a second catalytic converter 6. The second catalytic converter 6 is also a three-way catalyst disposed at a position under the vehicle floor. Further, the second catalytic converter 6 traps NOx component in the exhaust gas when the air-fuel ratio of the vehicle engine is leaner than the stoichiometric air-fuel ratio, but eliminates NOx component therefrom when the air-fuel ratio is equal to or richer than the stoichiometric air-fuel ratio, to purify exhaust gas by deoxidizing the eliminated NOx. The second catalytic converter 6 has an outlet thereof to which one end of a second exhaust pipe 7 is connected. The other end of the second exhaust pipe 7 is connected to a muffler 8.

As required, it is possible to additionally dispose a further catalytic converter having an HC-adsorbing ability of adsorbing HC when the engine is still in its low temperature range, and of eliminating the adsorbed HO at the time of high temperature of the engine, thereby purifying the exhaust gas. Alternatively, the second catalytic converter 6 may be additionally provided with the above-mentioned HC-adsorbing ability in addition to the afore-mentioned NOx-adsorbing ability.

The vehicle engine 1 is provided with a variable valve-timing mechanism 11, which works so as to change the valve timing of intake and exhaust valves of the engine 1, in response to a change in the method of combustion that consists of the spark ignition combustion mode and the self-ignition combustion mode.

FIGS. 2A and 2B illustrate the valve timing at the time of spark ignition combustion mode and at the time of self-ignition combustion mode, respectively.

In the valve timing of the spark ignition combustion mode, shown in FIG. 2A, there exists a valve-overlap duration where both the intake and exhaust valves are simultaneously placed in an open condition. On the contrary, in the valve timing of the self-ignition combustion mode, shown in FIG. 2B, the exhaust valve is closed before the top dead center (TDC), and the intake valve is opened after the TDC. Thus, around the TDC, there exists a valve-overlap duration where both the intake and exhaust valves are placed in a closed condition. The existence of the duration where both the intake and exhaust valves are placed in the closed condition around the TDC, permits a part of the combustion gas to be confined within the cylinder of the engine 1, The confined combustion gas contributes to an increase in the temperature of air-fuel mixture in the subsequent cycle, and the increase in the temperature enables the air-fuel mixture to be easily burned by self-ignition.

Referring again to FIG. 1, a control unit 20 is provided therein with a microcomputer. The control unit 20 selects one of the methods of combustion from the spark ignition combustion mode and the self-ignition combustion mode, on the basis of detection signals from various sensors. Then, the control unit 20 controls the operation of the afore-mentioned heater 4, and the variable valve timing mechanism 11 and further the operation of a fuel-injection valve (not illustrated) and an ignition plug 12, according to the above selected combustion mode.

As the above-mentioned various sensors, there are provided a water-temperature sensor (engine-temperature sensor) 21 that detects a cooling-water temperature Te typically representing the temperature of the engine 1, a catalyst-temperature sensor 22 that detects the temperature Tc of the afore-mentioned first catalytic converter 3, and a throttle sensor 22 that detects the opening degree of a throttle valve (not illustrated).

A detailed description of selection of the combustion mode during the idling operation of the engine 1 will be provided hereinbelow.

FIG. 3 is a map illustrating a temperature-region during the idling operation of the engine 1. The abscissa of the map indicates the temperature Tc of the catalyst, and the ordinate of the map indicates the temperature Te of the cooling water, i.e., the engine temperature.

During the idling operation of the engine 1, the above-mentioned control unit 20 (FIG. 1) detects which region in the temperature-region map of FIG. 3 corresponds to the temperature condition of the engine 1 at that time, and on the basis of the detection result, determines the combustion mode to be performed in the engine 1.

In the temperature-region map of FIG. 3, the threshold value Tc1 of the catalyst temperature Tc indicates a boundary temperature (e.g., at 250° C.) between activity and non-activity of the catalyst. Therefore, when the catalyst temperature Tc is lower than the above-mentioned threshold value Tc1, It is judged that the first catalytic converter 3 is in non-active condition, and when the catalyst temperature Tc is higher than the above-mentioned threshold value Tc1, It is judged that the first catalytic converter 3 is in active condition.

The threshold value Te1 of the cooling water temperature (the engine temperature) Te indicates a boundary temperature (e.g., at 60° C.) between possibility and impossibility of the self-ignition combustion mode.

Thus, when the cooling water temperature Te is higher than the threshold value Te1, it is judged that the self-ignition combustion mode can take place in the engine 1. However, when the cooling water temperature Te is lower than the threshold value Te1, it is judged that the self-ignition combustion mode cannot take place in the engine 1, and accordingly the engine must selectively be operated by the spark ignition combustion mode.

On the other hand, the threshold value Te2 of the cooling water temperature Te indicates a boundary temperature for judging whether or not the engine 1 is in a condition to be completely warmed up, and is usually set at a temperature, e.g., at 80° C., which is obviously higher than the threshold value Te1, Therefore, when the cooling water temperature Te is higher than the threshold value Te2, it is judged that the engine 1 has been completely warmed up. However, when the cooling water temperature Te is lower than the threshold value Te2, it is judged that the engine 1 is being warmed up. At this stage, it will be understood from FIG. 3 that a temperature region in which the cooling water temperature Te is higher than the threshold value Te1 and the catalyst temperature Tc is lower than the threshold value Tc1 is defined as temperature region (1). Further, a temperature region in which the cooling water temperature Te is lower than the threshold value Te1 is defined as temperature region (2). Furthermore, a temperature region in which the cooling water temperature Te is between the threshold values Te1 and Te2, and the catalyst temperature Tc is higher than the threshold value Tc1, is defined as temperature region (3) Further, a temperature region in which the cooling water temperature Te is higher than the threshold value Te2 and the catalyst temperature Tc is higher than the threshold value Tc1, is defined as temperature region (4).

The afore-mentioned control unit 20 conducts judgment as to which temperature region of the above-mentioned temperature regions (1) through (4) the present temperature condition of the engine 1 corresponds to, on the basis of the result of detections by the afore-mentioned water-temperature sensor 21 and catalyst-temperature sensor 22, and selects the combustion mode during the idling operation of the engine 1 on the basis of the above judgment in a manner described below.

Namely, when it is judged that the present temperature condition of the engine 1 corresponds to the temperature region (1), the control unit 20 selects the self-ignition combustion mode. When the present temperature condition corresponds to the temperature region (1), the first catalytic converter 3 is in its non-active condition where HC and NOx exhausted from the engine 1 is expelled into the atmosphere without being subjected to purifying treatment. Nevertheless, in the temperature region (1), since the cooling water temperature Te is higher than the threshold value Te1, it is possible to permit the self-ignition combustion mode to be performed in the engine 1 while extremely suppressing an exhaust amount of NOx from the engine 1. Thus, in the temperature region (1), when the self-ignition combustion mode is performed in the engine 1, even if the catalyst is in non-active condition where the NOx exhausted from the engine 1 is expelled into the atmosphere without being purified, the amount of expelling of the NOx into the atmosphere can be small. Also, in the Temperature region (1), in addition to the performance of the self-ignition combustion made, the heater 4 internally provided for the first catalytic converter 3 is operated. Since the first catalytic converter 3 is in non-active condition in the temperature region (1), if the self-ignition combustion mode in which the temperature of the exhaust gas is relative low is performed under such non-active condition of the converter 3, it takes a long time for the catalyst to be activated. Therefore, the operation of the heater 4 will heats the catalytic converter 3 so as to promote the first catalytic converter 3 to be activated, Thus, the catalyst can be heated up by an approximately equal way to a case where the spark ignition combustion mode is performed while producing an exhaust gas at a high temperature, and an amount of expelling of the NOx can be reduced before the catalyst is activated.

It should here be noted that deterioration in the specific fuel consumption due to an increase in the electrical load, which is caused by the operation of the heater 4, could be alleviated by an effect of enhancement of the specific fuel consumption due to a reduction in the pump loss in the self-ignition combustion mode.

When the present temperature condition of the engine 1 corresponds to the temperature region (2), the control unit 20 selects the spark ignition combustion mode.

In the temperature region (2), since the temperature of the engine 1 is rather low so that the self-ignition combustion mode cannot be stably performed, the spark ignition combustion mode is performed.

The temperature of the exhaust gas during the spark ignition combustion mode is relatively high, and therefore, the catalyst in the non-active condition can be quickly brought into the active condition. The high temperature exhaust gas also contributes to warning up of the engine 1 Thus, even after the active condition of the catalyst has been achieved, the high temperature exhaust gas due to the spark ignition combustion mode particularly contributes to promotion of warming up of the engine 1.

When the present temperature condition of the engine 1 corresponds to the temperature region (3), the temperature of the engine 1 has already been raised to a temperature condition in which the self-ignition combustion mode can be performed in the engine 1. Therefore, the control unit 20 selects one of the self-ignition combustion mode and the spark ignition combustion mode depending on a condition such that priority should be applied to either the improvement in performance of the specific fuel consumption or the promotion of warming up of the engine.

Namely, when the self-ignition combustion mode is selected in the temperature region (3), although a high performance in the specific fuel consumption can be obtained, the warming up of the engine 1 must take a long time because of a relative low temperature of the exhaust gas.

On the contrary, when the spark ignition combustion mode is selected in the temperature region (3), although a high performance in the specific fuel consumption might not be obtained, the high temperature of the exhaust gas from the engine 1 can surely promote early warming up of the engine 1 per se. Further, in the temperature region (3), the catalyst temperature Tc of the first catalytic converter 3 is kept higher than the threshold value Tc1, and accordingly the catalyst is in the active condition. Thus, in spite of selection of either of the self-ignition combustion mode and the spark ignition combustion mode, the exhaust gas can be sufficiently purified by the first catalytic converter 3. Therefore, if the self-ignition combustion mode is selected in the temperature region (3), an amount of expelling of the NOx can be appreciably reduced.

Now, in a vehicle provided with so-called idling-stop function in which an engine may be stopped when the vehicle is being stopped, an effect of improvement in the specific fuel consumption due to the Idling-stop function can be very large. Therefore, promoting of early warming up of the engine for allowing the idling-stop to be quickly executed can improve the specific fuel consumption Therefore, when an effect of improvement in the specific fuel consumption due to the idling-stop function is requested, the spark ignition combustion mode in the temperature region (3) is selected.

As described above, in the temperature region (3), on the basis of the requirements from the viewpoint of the specific fuel consumption, the performance in the exhaust gas treatment, and the engine performance, a preferable one of the self-ignition combustion mode and the spark ignition combustion mode is selected.

In the above-described embodiment the idling-stop function can be brought into practice by controlling the operation of the fuel injection valves and the starter motor of the engine 1 by the use of the control unit 20.

In the temperature region (4), the catalyst temperature Tc is kept higher than the threshold temperature Tc1, and accordingly the catalyst is in active condition. Further, it is judged that the warming up of the engine 1 has been completed in the region (4). Therefore, the self-ignition combustion mode, which is excellent in improving the performance of the specific fuel consumption as well as the performance of the exhaust gas treatment, is selected, Hereby, an improvement in the specific fuel consumption during the idling operation can b achieved, and also the expelling of the NOx can be suppressed to a minute amount.

Further, if the vehicle is provided with the above-mentioned idling-stop function, it is possible to execute the idling-stop function in the temperature region (4) to thereby further improve the performance of the specific fuel consumption, When the idling-stop function is executed, the burned exhaust gas does not flow toward the catalytic converter. Nevertheless, the temperature of the catalytic converter kept being higher than the threshold temperature Tc1 is lowered by only the heat dispersion toward the outside through the converter casing, Hereby, reduction in the temperature of the catalyst during the Idling-stop of the vehicle can be suppressed to the minimum limit, and accordingly the catalyst can be maintained in its active condition.

The flow chart of FIG. 4 illustrates the controlling steps to conduct selection of the combustion mode in the engine 1 on the basis of the above-described judgment of the temperature regions (1) through (4).

In Step S1 of the flow chart, it is judged whether or not the engine 1 is in idling operation. When the engine is not in the idling operation in Step S1, the controlling routine is terminated. When the engine is not in the idling operation, the combustion mode performed by the engine is determined by a separate controlling routine according to engine operating conditions including an engine load, an engine rotating speed, and the cooling water temperature Te.

When it is judged that the engine is in the idling operation, the controlling routine is forwarded to Step S2. In Step S2, it is judged whether or not the cooling water temperature (the engine temperature) Te is lower than the threshold value Te1. When it is judged that the cooling water temperature Te is lower than the threshold value Te1, i.e., when R is judged that the present condition of the engine corresponds to the temperature region (2), the controlling routine is forwarded to Step S3.

In Step S3, the spark ignition combustion mode is selected as the combustion mode to be performed during the idling operation.

On the other hand, when it is judged in Step S2 that the cooling water temperature Te is equal to or higher than the threshold value Te1, the controlling routine is forwarded to Step S4.

In the step S4, it is judged whether or not the catalyst temperature Tc is lower than the threshold value Tc1 (the temperature at which the catalyst is activated).

In Step S4, when it is judged that the catalyst temperature Tc is lower than the threshold value (the activated temperature), i.e., when it is judged that the present condition of the engine corresponds to the temperature region (1), the controlling routine is forwarded to Step S6.

In Step S6, the self-ignition combustion mode is selected as the combustion mode to be performed during the idling operation.

At this stage, when the controlling routine is forwarded to Step S6 for the reason that the present condition corresponds to the temperature region (1), and also when the self-ignition combustion mode is selected as the combustion mode for the idling operation, the heater 4 of the catalytic converter 3 is operated to activate the converter 3.

Further, in Step S4, when it is judged that the catalyst temperature Tc is equal to or higher than the threshold value Tc1, the controlling routine is forwarded to Step S5.

In Step S5, ft is judged whether or not the cooling water temperature Te is lower than the threshold value Te2 (>threshold value Te1). In Step S5, when it is judged that the cooling water temperature Te is lower than the threshold value Te2, I.e., when the present condition of the engine 1 corresponds to the temperature region (3), the controlling routine is forwarded to Step S7, In Step S7, either the self-ignition combustion mode or the spark ignition combustion mode is set as the combustion mode during the idling operation of the engine according to the preliminary selection from the viewpoint of the engine characteristic and performance.

On the other hand, when it is judged that the cooling water temperature Te is equal to or higher than the threshold value Te2, i.e., when the present condition of the engine corresponds to the temperature region (4), the controlling routine is forwarded to Step S6.

In Step S6, the self-ignition combustion mode is selected as the combustion mode during the idling operation.

It should be understood that when the controlling routine is forwarded to Step S6 for the reason that the present condition corresponds to the temperature region (4), and when the self-ignition combustion mode is selected as the combustion mode during the Idling operation, the control unit 20 permits the idling-stop function to be operated, so that the engine is stopped when the vehicle is being stopped.

The entire contents of Japanese Patent Application No. 2001-114997, filed on Apr. 13, 2001 are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments of the present invention are provided for illustration purpose only, and not for the purpose of limiting the invention as defined by the appended claims and their equivalents.

What is claimed is:

1. An apparatus for controlling a vehicle engine provided with a catalytic converter in an exhaust passage, comprising:
   an engine temperature sensor detecting a temperature Te of the engine;
   a catalyst temperature sensor detecting a temperature Tc of a catalyst in the catalytic converter; and
   a control unit programmed to:
      select a combustion mode from a self-ignition combustion mode and a spark ignition combustion mode based on the engine temperature Te and the catalyst temperature Tc; and
      control the engine according to the selected combustion mode when the engine is in idling operation,
   wherein the control unit is further programmed to:
      select the self-ignition combustion mode when the engine temperature Te is higher than a first threshold value Te1, and when the catalyst temperature Tc is lower than a threshold value Tc1; and
      select the self-ignition combustion mode when the engine temperature Te is higher than a second threshold value Te2 which is higher than the first threshold value Te1, and when the catalyst temperature Tc is higher than the threshold value Tc1; and
      select the spark ignition combustion mode when the engine temperature Te is between the first threshold value Te1 and the second threshold value Te2, and when the catalyst temperature Tc is higher than the threshold value Tc1.

2. An apparatus for controlling a vehicle engine according to claim 1, wherein the control unit is further programmed to operate a heater heating the catalytic converter when the engine temperature Te is higher than the first threshold value Te1, and when the catalyst temperature Tc is lower than the threshold value Tc1.

3. An apparatus for controlling a vehicle engine according to claim 1, wherein the control unit is further programmed to select the spark ignition combustion mode when the engine temperature Te is lower than the first threshold value Te1.

4. An apparatus for controlling a vehicle engine according to claim 1, wherein the control unit is further programmed to stop the engine when the engine temperature Te is higher than the second threshold value Te2, and when the catalyst temperature Tc is higher than the threshold value Tc1, and when the vehicle is being stopped.

5. An apparatus for controlling a vehicle engine provided with a catalytic converter in an exhaust passage, comprising:
   an engine temperature sensor detecting a temperature Te of the engine;
   a catalyst temperature sensor detecting a temperature Tc of a catalyst in the catalytic converter; and
   a control unit programmed to:
      select a combustion mode from a self-ignition combustion mode and a spark ignition combustion mode based on the engine temperature Te and the catalyst temperature Tc; and
      control the engine according to the selected combustion mode when the engine is in idling operation,
   wherein the control unit is further programmed to:
      select the self-ignition combustion mode when the engine temperature Te is higher than a first threshold value Te1, and when the catalyst temperature Tc is lower than a threshold value Tc1; and
      stop the engine when the engine temperature Te is higher than a second threshold value Te2 which is higher than the first threshold value Te1, and when the catalyst temperature Tc is higher than the threshold value Tc1, and when the vehicle is being stopped.

6. An apparatus for controlling a vehicle engine according to claim 5, wherein the control unit is further programmed to operate a heater heating the catalytic converter when the engine temperature Te is higher than the first threshold value Te1, and when the catalyst temperature Tc is lower than the threshold value Tc1.

7. An apparatus for controlling a vehicle engine according to claim 5, wherein the control unit is further programmed to select the spark ignition combustion mode when the engine temperature Te is lower than the first threshold value Te1.

8. A method of controlling a vehicle engine provided with a catalytic converter in an exhaust passage, comprising steps of:
   detecting a temperature Te of the engine;
   detecting a temperature Tc of a catalyst in the catalytic converter;
   selecting a combustion mode from a self-ignition combustion mode and a spark ignition combustion mode based on the engine temperature Te and the catalyst temperature Tc; and controlling the engine according to the selected combustion mode when the engine is in idling operation, wherein the step of selecting the combustion mode comprises steps of:

selecting the self-ignition combustion mode when the engine temperature Te is higher than a first threshold value Te1, and when the catalyst temperature Tc is lower than a threshold value Tc1;

selecting the self-ignition combustion mode when the engine temperature Te is higher than a second threshold value Te2 which is higher than the first threshold value Te1, and when the catalyst temperature Tc is higher than the threshold value Tc1; and selecting the spark ignition combustion mode when the engine temperature Te is between the first threshold value Te1 and the second threshold value Te2, and when the catalyst temperature Tc is higher than the threshold value Tc1.

9. A method of controlling a vehicle engine according to claim 8, further comprising a step of heating the catalytic converter when the engine temperature Te is higher than the first threshold value Te1, and when the catalyst temperature Tc is lower than the threshold value Tc1.

10. A method of controlling a vehicle engine according to claim 8, wherein the step of selecting the combustion mode further comprises a step of selecting the spark ignition combustion mode when the engine temperature Te is lower than the first threshold value Te1.

11. A method of controlling a vehicle engine according to claim 8, further comprising a step of stopping the engine when the engine temperature Te is higher than the second threshold value Te2, and when the catalyst temperature Tc is higher than the threshold value Tc1, and when the vehicle is being stopped.

12. A method of controlling a vehicle engine provided with a catalytic converter in an exhaust passage, comprising steps of:

detecting a temperature Te of the engine;

detecting a temperature Tc of a catalyst in the catalytic converter;

selecting a combustion mode from a self-ignition combustion mode and a spark ignition combustion mode based on the engine temperature Te and the catalyst temperature Tc; and controlling the engine according to the selected combustion mode when the engine is in idling operation, wherein the step of selecting the combustion mode comprises steps of:

selecting the self-ignition combustion mode when the engine temperature Te is higher than a first threshold value Te1, and when the catalyst temperature Tc is lower than a threshold value Tc1; and stopping the engine when the engine temperature Te is higher than a second threshold value Te2 which is higher than the first threshold value Te1, and when the catalyst temperature Tc is higher than the threshold value Tc1, and when the vehicle is being stopped.

13. A method of controlling a vehicle engine according to claim 12, further comprising a step of heating the catalytic converter when the engine temperature Te is higher than the first threshold value Te1, and when the catalyst temperature Tc is lower than the threshold value Tc1.

14. A method of controlling a vehicle engine according to claim 12, wherein the step of selecting the combustion mode further comprises a step of selecting the spark ignition combustion mode when the engine temperature Te is lower than the first threshold value Te1.

* * * * *